United States Patent [19]

Sawai

[11] Patent Number: 5,100,489
[45] Date of Patent: Mar. 31, 1992

[54] METHOD AND APPARATUS FOR STICKING BELT-SHAPED MEMBER ONTO FORMING DRUM

[75] Inventor: Minoru Sawai, Tokyo, Japan

[73] Assignee: Bridgestone Corporation, Tokyo, Japan

[21] Appl. No.: 454,569

[22] Filed: Dec. 21, 1989

[30] Foreign Application Priority Data

Mar. 11, 1989 [JP]  Japan ................................. 1-58271

[51] Int. Cl.⁵ ............................................. B29D 30/30
[52] U.S. Cl. .................................. 156/123; 156/405.1; 156/406.4
[58] Field of Search ............... 156/405.1, 406.4, 110.1, 156/412, 123, 133, 516, 517, 250

[56] References Cited

U.S. PATENT DOCUMENTS

4,844,768  7/1989  Kimura .
4,867,434  9/1989  Okuyama .

FOREIGN PATENT DOCUMENTS

59-207227  11/1984  Japan .
64-30737   2/1989   Japan .

Primary Examiner—Michael W. Ball
Assistant Examiner—Daniel J. Stemmer
Attorney, Agent, or Firm—Sughrue, Mion, Zinn, Macpeak & Seas

[57] ABSTRACT

An apparatus for sticking a belt-shaped member onto a forming drum includes an anvil movable toward and away from the belt-shaped member to be in contact with the belt-shaped member and to form a space between the anvil and the belt-shaped member. The apparatus includes a cutter for cutting the belt-shaped member at a cutting position, and a grasping unit movable between the cutting position and the forming drum for grasping the belt-shaped member. The grasping unit grasps a cut leading end of the belt-shaped member when part of the grasping unit has entered the space. The grasping unit further includes a pressing unit for pressing the leading end of the belt-shaped member against the forming drum and urging member for urging and positionally fixing the belt-shaped member immediately behind of the cutting position over an entire width of the belt-shaped member when the urging member moved toward the belt-shaped member. The urging member is deformable following to an outer contour of the belt-shaped member.

9 Claims, 7 Drawing Sheets

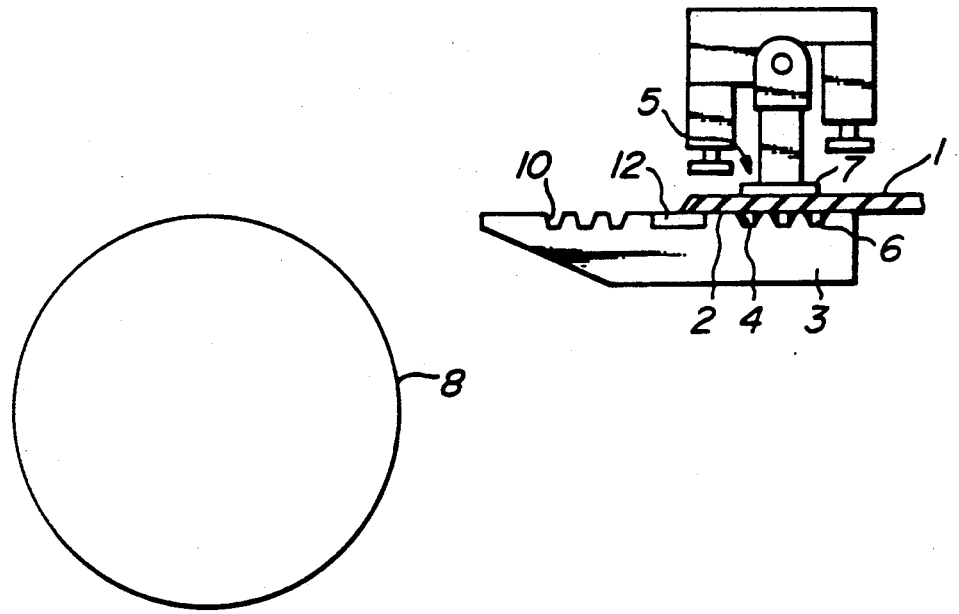
FIG_1a
PRIOR ART
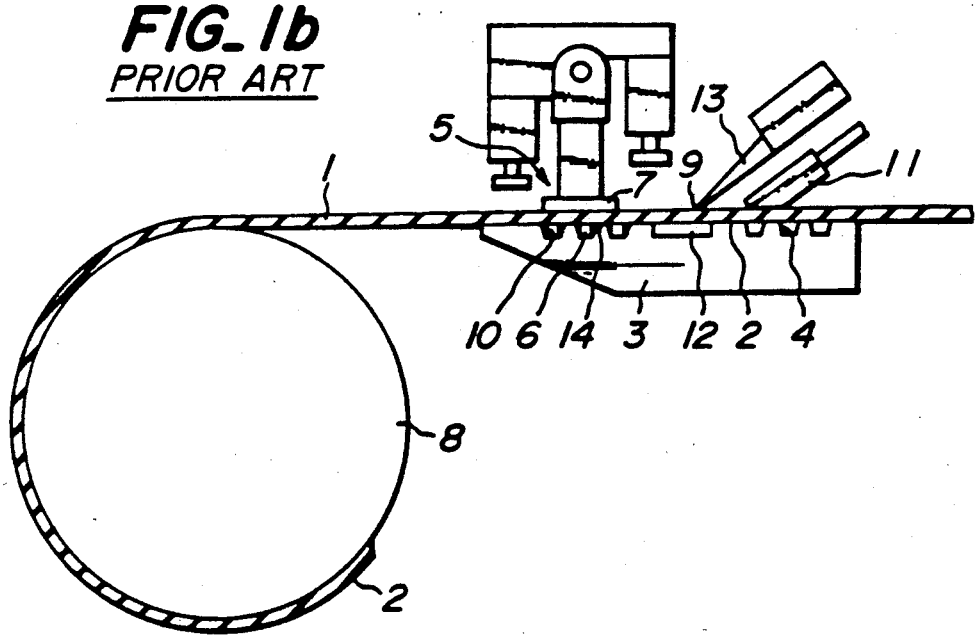
FIG_1b
PRIOR ART

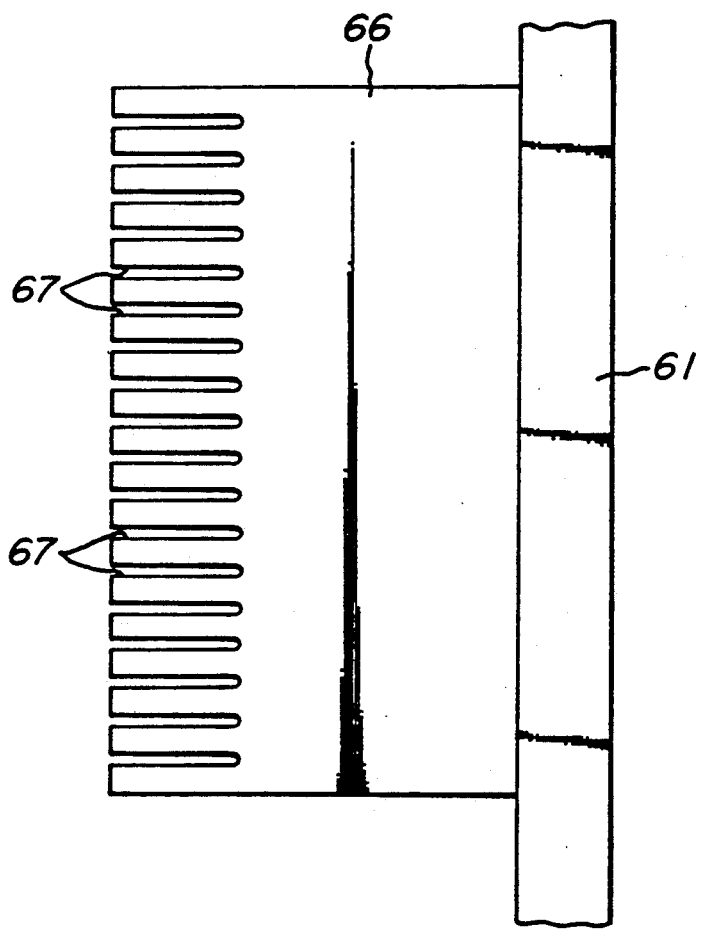
FIG._4

FIG_5
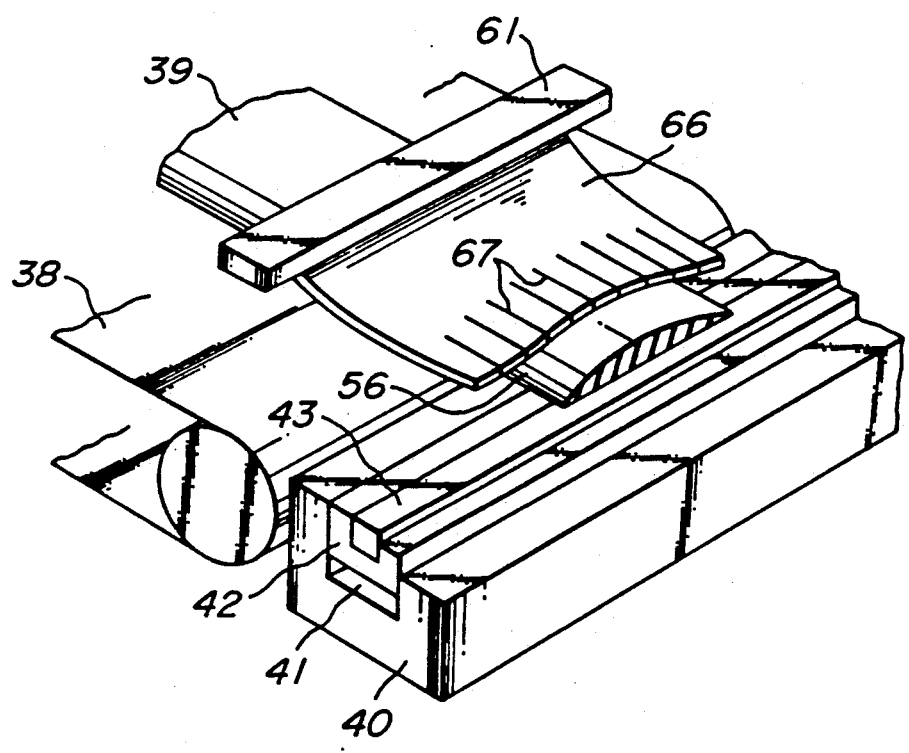

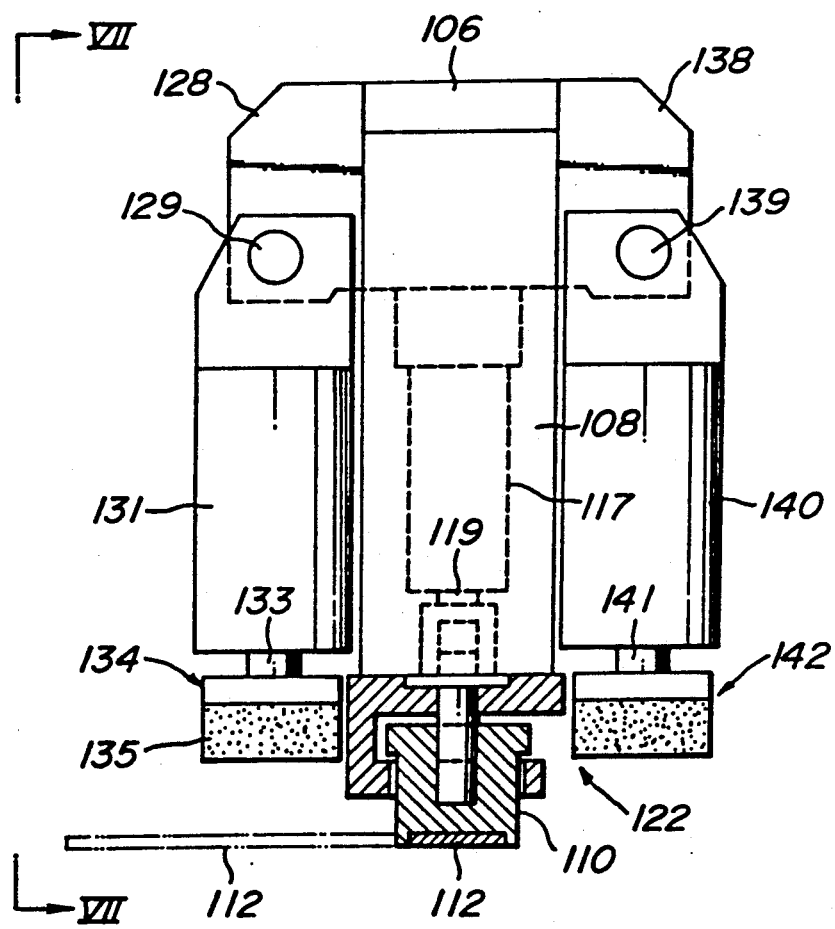

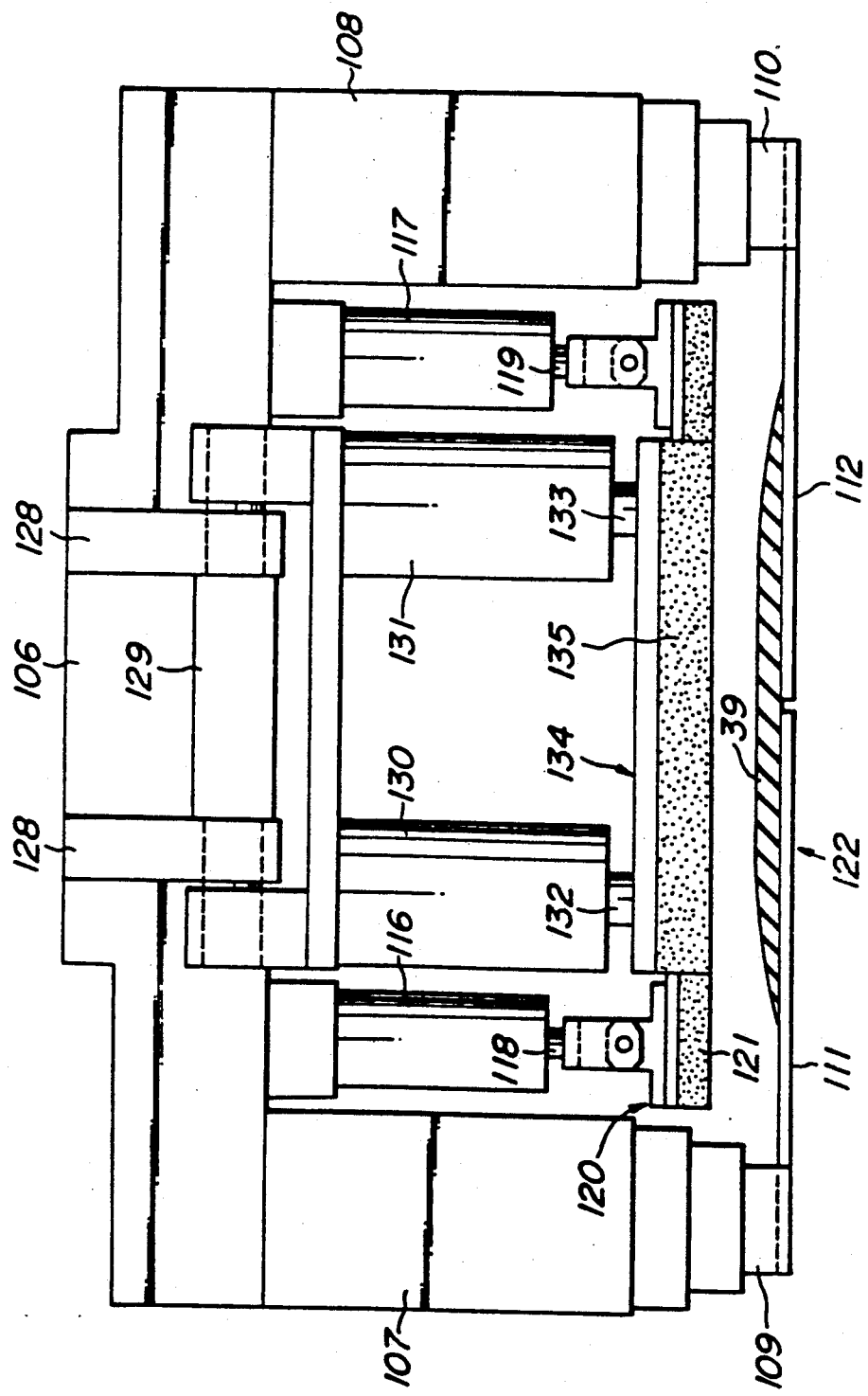

METHOD AND APPARATUS FOR STICKING BELT-SHAPED MEMBER ONTO FORMING DRUM

BACKGROUND OF THE INVENTION

This invention relates to a method and an apparatus for sticking a continuous belt-shaped member onto a circumference of a forming drum, while cutting the continuous belt-shaped member.

The assignee of the application had proposed a method of sticking a belt-shaped member onto a forming drum with high accuracy in a reliable manner as shown in FIGS. 1a and 1b. With this method, as shown in FIG. 1a after a leading end 2 of a continuous belt-shaped member 1 has been grasped on both sides by lower pawls 6 inserted in grooves 4 of a receiving member 3 and an upper pawl 7 of a grasping unit 5, the grasping unit 5 is moved together with the belt-shaped member 1 toward a forming drum 8 to press the leading end 2 of the belt-shaped member 1 against the forming drum 8.

The belt-shaped member 1 is supplied onto the forming drum 8 being rotated to stick the belt-shaped member 1 on a substantial part of a circumference of the forming drum 8. The belt-shaped member 1 is then grasped at a position immediately before a cutting position 9 or spaced from a leading end a distance substantially equal to a circumferential length of the forming drum 8 by the lower pawls 6 inserted in grooves 10 and an upper pawl 7 of a grasping unit 5 as shown in FIG. 1b. On the other hand, the belt-shaped member 1 is pressed and positionally fixed against the receiving member 3 at a position immediately behind the cutting position 9 by a plurality of urging blocks 11 spaced from each other in width directions of the belt-shaped member 1.

A cutter 13 is caused to approach an anvil 12 of the receiving member 3 in contact with the belt-shaped member 1 at the cutting position 9, so that the belt-shaped member 1 is cut at the cutting position by the anvil 12 and the cutter 13. As a result, the portion grasped by the grasping unit 5 becomes a trailing end 14 of the belt-shaped member 1, while the portion positionally fixed by the urging blocks 11 becomes a leading end 2 of the belt-shaped member 1.

The grasping unit 5 and the belt-shaped member 1 ar moved toward the forming drum 8 being rotated to stick the remaining belt-shaped member 1 around the forming drum 8. As a result, the belt-shaped member 1 of a length substantially corresponding to one circumferential length of the forming drum is stuck onto the circumference of the forming drum 8. The cutter 13 is then moved away from the belt-shaped member 1, while the urging blocks 11 are moved away from the belt-shaped member 1 to release it from the positional fixation. The grasping unit 5 is then moved toward the receiving member 3 so that after the lower pawls 6 of the grasping unit 5 have been inserted into the grooves 4 of the receiving member 5, the leading end 2 of the belt-shaped member 1 is grasped by the upper and lower pawls 7 and 6.

With this method, there is no problem when a cross-section of the belt-shaped member is rectangular. However, in the case of a belt-shaped member having a cross-section whose thickness progressively increases toward a center in its width direction, only the center is securely urged and restrained by the urging blocks 11. As a result, both side edges of the belt-shaped member are locally contractively deformed.

Moreover, as side edges of the leading end 2 are only in contact with inner edges of the urging blocks 11, line-shaped scores often appear in a surface of the leading end 2 of the belt-shaped member. In this method, furthermore, since the urging position and the grasping position for the belt-shaped member are unavoidably coincident with each other, the urging blocks 11 are once moved away from the leading end 2 of the belt-shaped member 1 and thereafter the leading end 2 is grasped by the grasping unit 5. As a result, the restraining of the leading end 2 is lost for a short time so that the leading end 2 moves on the receiving member 3 or contractively deforms.

SUMMARY OF THE INVENTION

It is therefore an object of the invention to provide a method and an apparatus for sticking a belt-shaped member onto a forming drum, which are capable of preventing contractive deformations and scores in a leading end of the belt-shaped member.

In order to accomplish this object, a method of sticking a belt-shaped member on a forming drum according to the invention comprises steps of moving grasping means grasping a cut leading end of a belt-shaped member toward the forming drum to press the leading end of the belt-shaped member against the forming drum by pressing means, supplying the belt-shaped member onto the forming drum being rotated to stick the belt-shaped member onto a substantial part of a circumference of the forming drum, grasping the belt-shaped member at a position immediately before a cut position spaced from the cut leading end distance substantially equal to one circumferential length of the forming drum, while pressing and positionally fixing the belt-shaped member at a position immediately behind the cutting position over an entire width of the belt-shaped member by urging means deformable following to an outer contour of the belt-shaped member, cutting the belt-shaped member at the cutting position by cutting means and an anvil in contact with the belt-shaped member, moving the grasping means grasping a trailing end of the belt-shaped member toward the forming drum being rotated to stick the remaining belt-shaped member onto the circumference of the forming drum, moving the anvil away from the belt-shaped member to form a space between the anvil and the belt-shaped member, grasping the cut leading end of the belt-shaped member by the grasping unit after part of the grasping unit has entered the space, and moving the urging member away from the belt-shaped member to release the belt-shaped member from its positional fixation.

In a second aspect of the invention, an apparatus for sticking a belt-shaped member onto a forming drum comprises a rotatable forming drum around which a belt-shaped member is stuck, an anvil arranged rearwardly of the forming drum and movable toward and away from the continuous belt-shaped member so that the anvil becomes in contact with the belt-shaped member when moved toward the belt-shaped member and a space is formed between the anvil and the belt-shaped member when moved away from the belt-shaped member, cutting means for cutting the belt-shaped member at a cutting position spaced from a cut leading end of the belt-shaped member a distance substantially equal to one circumferential length of the forming drum, grasping means movable between the proximity of the cutting position and the forming drum for grasping the belt-shaped member, said grasping means grasping the cut leading end of the belt-shaped member when part of the grasping means has entered said space, pressing means for pressing the leading end of the belt-shaped member against the forming drum, and urging means movable toward and away from the belt-shaped member and urging and positionally fixing the belt-shaped member immediately behind the cutting position over an entire width of the belt-shaped member when the urging means moved toward the belt-shaped member, said urging means being deformable following to an outer contour of the belt-shaped member.

It is now assumed that a cut leading end of a belt-shaped member is grasped by the grasping means. The grasping means is then moved together with the belt-shaped member toward the forming drum to press the leading end of the belt-shaped member against the forming drum by the pressing means. After the grasping mean has been moved away from the belt-shaped member, the member is supplied to the forming drum being rotated to stick the belt-shaped member onto a substantial part of the circumference of the forming drum.

The belt-shaped member is then grasped at a position immediately before the cutting position or a position spaced from the leading end a distance substantially equal to the one circumferential length of the forming drum by means of the grasping means. The belt-shaped member is then cut at the cutting position by means of the cutting means and the anvil in contact with the belt-shaped member at the cutting position. In this case, the time when the anvil starts to contact the belt-shaped member may be at any instant so long as it is after the grasping means has started to move together with the cut leading end toward the forming drum and before the belt-shaped member is cut by the cutting means.

Once the cutting of the belt-shaped member as above described has been effected, the portion of the belt-shaped member grasped by the grasping means becomes a trailing end thereof, while the portion of the member urged by the urging means becomes a leading end thereof. In this case, the urging means is deformable following an outer contour of the belt-shaped member and is urging the belt-shaped member over its entire width. Therefore, the urging means can uniformly press the leading end of the belt-shaped member in its entirety even if the belt shaped member has a cross-section progressively increasing its thickness toward a center in width directions. As a result, the leading end of the belt-shaped member does not locally contractively deform or is not scored.

The grasping means grasping the trailing end of the belt-shaped member is then moved toward the forming drum being rotated to stick the remaining belt-shaped member on the circumference of the forming drum. Therefore, the belt-shaped member is wound substantially one circumferential length around the forming drum. On the other hand, the anvil in contact with the belt-shaped member is moved away from the belt-shaped member to form a space between the anvil and the cut leading end of the belt-shaped member.

Part of the grasping means is then inserted into the space and the cut leading end of the belt-shaped member is grasped by the grasping means. In this case, the time when the anvil is moved away from the belt-shaped member may be any time so long as it is after the belt-shaped member has been cut by the cutting means and before the cut leading end of the belt-shaped member is grasped by the grasping means.

With the arrangement as above described, the cutting position and the grasping position are coincident with each other so that the urging position can be spaced from the grasping position. As a result, it is not required to move the urging means away from the belt-shaped member before the cut leading end is grasped. Therefore, the urging means can continue restraining the leading end of the belt-shaped member by the urging means until the cut leading end is grasped by grasping means. Accordingly, any movement and contractive deformation of the leading end of the belt-shaped member are prevented. Thereafter, the urging means is moved away from the belt-shaped member to release the member from the positional fixation.

The invention will be more fully understood by referring to the following detailed specification and claims taken in connection with the appended drawings.

BRIEF DESCRIPTION OF THE DRAWINGS

FIGS. 1a and 1b are front elevations of a main part of an apparatus of the prior art for explaining a method of sticking a belt-shaped member to a forming drum of the prior art;

FIG. 4 is a plan view illustrating the urging member viewed in directions shown by arrows IV—IV in FIG. 3;

FIG. 5 is a perspective view illustrating the proximity of the anvil and the urging member used in the apparatus shown in FIG. 2;

FIG. 6 is a front view of the proximity of a grasping unit used in the apparatus shown in FIG. 2; and FIG. 7 is a side view of the proximity of the grasping unit viewed in directions shown by arrows VII—VII in FIG. 6.

DETAILED EXPLANATION OF THE PREFERRED EMBODIMENTS

Figure 2:
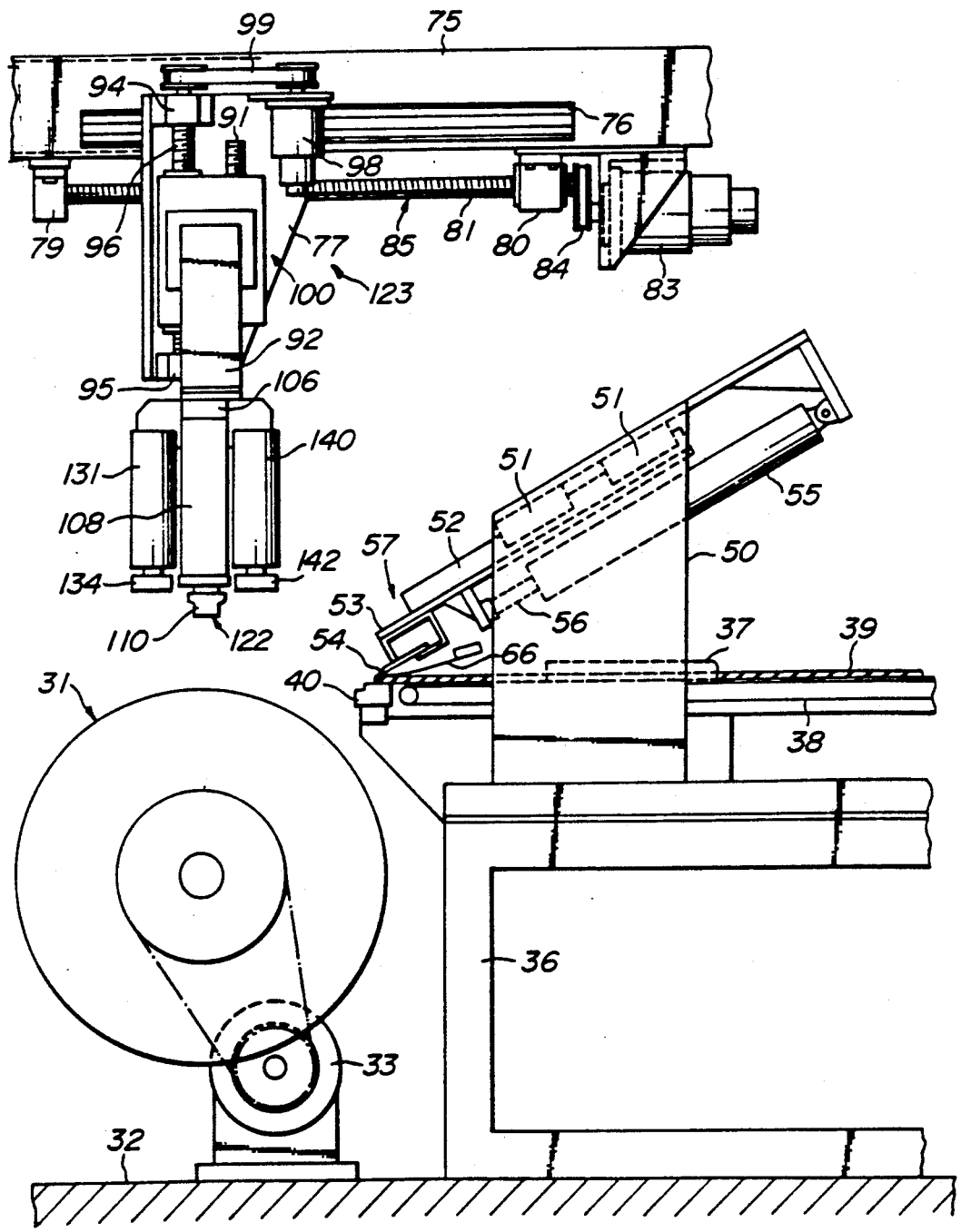
FIG. 2 is a front view illustrating a whole apparatus of one embodiment of the invention.

Referring to FIG. 2, a rotatable forming drum 31 for forming a green tire is rotated a required number of revolutions at any rotating speed by a DC servomotor 33 with a speed reduction device arranged on a floor 32. On the floor rearwardly of the forming drum 31 is arranged a frame 36 supporting thereon a conveyor 38 extending in forward and rearward directions. A continuous belt-shaped member 39 such as a side tread or the like on the conveyor 38 is urged from both sides by centering plates 37 to be subjected to a centering operation, being brought to the center of the conveyor 38. The conveyor 38 supplies the centered belt-shaped member 39 to the forming drum 31 to stick the member 39 around the forming drum 31.

Figure 3:
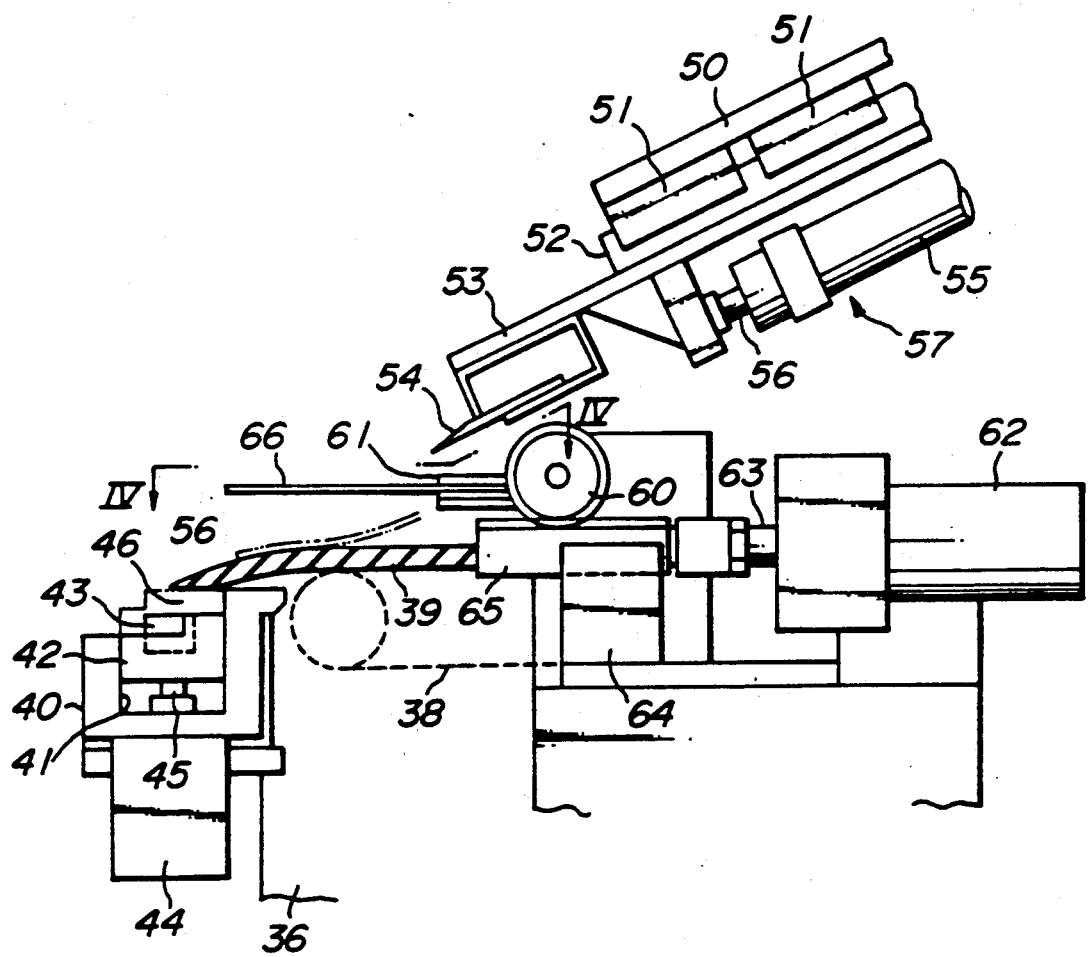
FIG. 3 is a front view of the proximity of an anvil and an urging member used in the apparatus shown in FIG. 2.

As shown in FIG. 3, a receiving member 40 extending in width directions of the belt-shaped member 39 is secured to a front end of the frame 36. The receiving member 40 is formed with a channel groove 41 extending in longitudinal directions on a side with which the belt-shaped member slidably contacts. An anvil 42 is liftably received in the channel groove 41 to extend in width directions of the belt-shaped member. The anvil 42 has a cutter abutting portion 43 against which a blade of a cutter later described, abuts.

A cylinder 44 is fixed to the receiving member 40 immediately below the anvil 42 and has a piston rod 45 whose end is connected to the anvil 42. As a result, the anvil 42 is movable toward and away from the belt-shaped member 39 by operations of the cylinder 44. In other words, when the piston rod 45 of the cylinder 44 is extended, the anvil 42 approaches the belt-shaped member 39 and contacts a back surface (lower surface) of the member 39, while when the piston rod 45 is retracted, the anvil 42 moves away from the back surface of the member 39 to form a space 46 between the anvil 42 and the member 39.

Referring to FIGS. 2 and 3, a bracket 50 is mounted onto a front end of the frame 36. The bracket 50 supports a carriage 53 obliquely forwardly movable guided by the slide blocks 51 and rails 52. A cutter 54 having a heater (not shown) built therein is mounted on a front end of the carriage 53. When the carriage 53 is moved toward the cutter abutting portion 43 of the anvil 42, the cutter 54 cuts the belt-shaped member 39 in the width direction in cooperation with the anvil 42 at a cutting position which is spaced from the cut leading end of the belt-shaped member 39 a distance substantially equal to a one circumferential length of the forming drum 31. The anvil 42, the carriage 53, the cutter 54 and the cylinder 55 form as a whole cutting means 57 for cutting the belt-shaped member 39 in its width direction at the cutting position.

A pinion 60 is rotatably supported on the frame 36 rearwardly of the cutter receiving portion 40. A support plate 61 extending in width directions of the belt-shaped member 39 is fixed to the pinion 60. To the frame 36 is fixed a cylinder 62 having a piston rod 63. To a free end of the piston rod 63 is fixed a rack 65 in mesh with the pinion 60 and slidably supported on a support block 64. To the support plate 61 is secured a rear end of a rectangular urging member 66 made of a thin leaf spring as shown in FIGS. 3 and 4. The urging member 66 is rockable toward and away from the belt-shaped member 39 by actuation of the cylinder 62. When the piston rod 63 is retracted to cause the urging member 66 to approach the belt-shaped member 39, a free end of the urging member 66 forces the member 39 immediately rearward of the cutting position against the receiving member 40 so that the belt-shaped member 39 is fixed thereat.

In this case, the urging member 66 is wider than the belt-shaped member 39 as shown in FIGS. 3, 4 and 5 so that the member 39 is urged over an entire width thereof. Moreover, the urging member 66 is formed at its forward end with a number of slits 67 opening forwardly and arranged in a row in the width direction and spaced apart equal distances. Therefore, when the urging member 66 is urged against the belt-shaped member 39, the forward end of the urging member 66 is flexibly deformed following to an outer contour of the belt-shaped member 39. A thickness of the urging member 66 preferably 0.3-1.0 mm. On the other hand, a pitch of the slits 67 of the urging member 66 is preferably 3-15 mm.

Referring again to FIG. 2, above the forming drum 31 is arranged a beam 75 extending in the forward and rearward directions. Horizontal rails 76 are fixed to both side surfaces of the beam 75. A traveling frame 77 is fitted on the rails 76 to be hung from the beam 75 slidably in the forward and rearward directions. To a lower surface of the beam 75 are mounted a pair of bearings 79 and 80 spaced in the forward and rearward directions and rotatably supporting a screw shaft 81 threadedly engaging in the traveling frame 77.

A DC servomotor 83 is fixed to the beam 75 rearwardly of the bearing 80, whose torque is transmitted through a belt 84 to the screw shaft 81. When the motor 83 is energized, the screw shaft 81 is rotated to reciprocably move the traveling frame 77 guided by the rails 76 in the forward and rearward directions. The traveling frame 77, the screw shaft 81 and the motor 83 form as a whole forward and rearward moving mechanism 85 for moving grasping members later described.

To the traveling frame 77 is fixed a vertically extending rail 91 liftably supporting a lift frame 92. To the traveling frame 77 is mounted a pair of bearings 94 and 95 rotatably supporting a vertical screw shaft 96 which is threadedly engaged with the lift frame 92. Onto the traveling frame 77 is mounted a DC servomotor 98 whose torque is transmitted through a belt 99 to the screw shaft 96, with the result that when the motor 98 is energized, the lift frame 92 is raised or lowered. The lift frame 92, the screw shaft 96 and the motor 98 form as a whole a lift mechanism 100 for lifting the grasping members later described.

Referring to FIGS. 2, 6 and 7, to a lower end of the lift frame 92 is fixed a horizontal bracket 106 extending in the width directions of the belt-shaped member 39 and having vertically extending rotary actuators 107 and 108 secured to a lower surface of the bracket 106 at both ends thereof in longitudinal directions. Connecting pieces 109 and 110 are fixed to free ends of the rotating shafts of these rotary actuators 107 and 108. To lower surfaces of the connecting pieces 109 and 110 are fixed bottom portions of horizontal lower grasping members 111 and 112, respectively, whose lengths are substantially equal to one half of a distance between the rotary actuators 107 and 108.

The lower grasping members 111 and 112 are rocked in a horizontal plane in synchronism with each other by actuation of the rotary actuators 107 and 108 to assume grasping positions in parallel with the width direction of the belt-shaped member 39 and poising positions in parallel with the longitudinal direction of the member 39. A pair of vertical cylinders 116 and 117 are fixed to the lower surface of the bracket 106 between the rotary actuators 107 and 108. To lower ends of the piston rods of the cylinders 116 and 117 are connected both ends of a horizontal upper grasping member 120 extending in the width directions of the belt-shaped member 39 above the lower grasping members 111 and 112.

The upper grasping member 120 has at its lower portion foamed body 121 such as sponge or the like. When the lower grasping members 111 and 112 are closed and rocked to the grasping positions by the actuation of the rotary actuators 107 and 108 and the upper grasping member 120 is lowered by the action of the cylinders 116 and 117, the belt-shaped member is grasped with its upper and lower surfaces by the upper and lower grasping members 120 and 111 and 112.

The rotary actuators 107 and 108, the lower grasping members 111 and 112, the cylinders 116 and 117 and the upper grasping member 120 form as a whole a grasping unit 122 for grasping the belt-shaped member 39 immediately before of the cutting position or the cut leading end 56 of the member 39. Moreover, the forward and rearward moving mechanism 85 and the lift mechanism 100 form as a whole moving means 123 for moving the grasping unit 122 between the proximity of the cutting position and the forming drum 31.

Brackets 128 are fixed to a front surface of the bracket 106 (FIG. 7). To the brackets 128 are connected through a pin 129 a pair of vertical cylinders 130 and 131 having piston rods 132 and 133, to which ends are secured a first pressing pad 134 horizontally extending in width directions of the belt-shaped member 39. The first pressing pad 134 has a foamed body 135 as sponge or the like. On the other hand, brackets 138 are also fixed to a rear surface of the bracket 106 (FIG. 6). To the brackets 138 are connected through a pin 139 a pair of vertical cylinders 140 having piston rods 141 to which ends are secured a second pressing pad 142 having a construction similar to the first pressing pad 134.

The operation of the apparatus of the embodiment above described will be explained hereinafter.

It is now assumed that the cut leading end 56 of the belt-shaped member 39 on the receiving member 40 is grasped by the grasping unit 122 consisting of the lower grasping members 111 and 112 positioned in the grasping position below the member 39 and the upper grasping
r member 120 lowered above the member 39. The motor 83 is energized to rotate the screw shaft 81 and the motor 98 is energized to rotate the screw shaft 96 so that the grasping unit 122 grasping the cut leading end 56 of the belt-shaped member 39 is moved from the receiving member 40 toward the forming drum 31. In this case, the conveyor 38 is driven at a speed substantially equal to the moving speed of the grasping unit 122 to supply the belt-shaped member 39 onto the forming drum 31.

When the grasping unit 122 has arrived directly above a top of the forming drum 31, the movements of the grasping unit 122 and the conveyor 38 are stopped. Thereafter, the cylinder 140 is actuated to press the leading end of the belt-shaped member 39 against the forming drum 31 by the second pressing pad 142. The cylinders 116 and 117 are then actuated to move the upper grasping member 120 away from the cut leading end 56 of the belt-shaped member 39 to release the cut leading end 56 from the grasping unit 122.

The motors 83 and 98 are then energized to move the grasping unit 122 slightly forward to remove the lower grasping members 111 and 112 from between the belt-shaped member 39 and the forming drum 31. In this case, the second pressing pad 142 continues to press the belt-shaped member 39 in the same position so that the cylinder 140 is slightly rocked about the pin 139 in a counterclockwise direction viewed in FIG. 2. Thereafter, the cylinder 140 is actuated to move the second pressing pad 142 away from the belt-shaped member 39. The cylinder 140 is then returned to the initial vertical position by an action of a spring (not shown).

Under this condition, the cylinder 140 is actuated to press the proximity of the cut leading end 56 of the belt-shaped member 39 against the forming drum 31 by the second pressing pad 142. The second pressing pad 142 is then moved away from the belt-shaped member 39. Thereafter, the motors 83 and 98 are energized to raise slightly and then move rearwardly the grasping unit 122 until it arrives immediately before and above the receiving member 40.

At this moment, the rotary actuators 107 and 108 are actuated to rotate the lower grasping members 111 and 112 in the horizontal plane from the grasping position to the poising position. At this moment, moreover, the motor 33 is energized to rotate the forming drum 31, while the conveyor 38 is driven at the speed substantially equal to the circumferential speed of the forming drum 31 so that the belt-shaped member 39 is supplied to the forming drum 31 to stick the member 39 onto a substantial part of the circumference, for example, of the order of 4/5 of the circumference of the forming drum 31.

The motor 98 is then energized to lower the grasping unit 122 until the lower grasping members 111 and 112 arrive slightly below the lower surface of the belt-shaped member 39. Thereafter, the rotary actuators 107 and 108 are actuated to rotate the lower grasping members 111 and 112 from the poised position to the grasping position to cause the lower grasping members 111 and 112 to penetrate immediately under the belt-shaped member 39.

The cylinder 62 is actuated so as to retract the rack 65 to rotate the pinion 60 and the urging member 66 in a counterclockwise direction viewed in FIG. 3. As a result, the forward or leading end of the urging member 66 presses against the receiving member 40 the belt-shaped member 39 at a position immediately behind the cutting position or immediately rearwardly of a position spaced from the cut leading end 56 by a distance substantially equal to one circumferential length of the forming drum 31. In this manner, that portion of the belt-shaped member 39 is positionally fixed thereat.

At this instant, the motor 83 is energized to move the grasping unit 122 rearwardly until it arrives immediately above the receiving member 40. Thereafter, the cylinders 116 and 117 are actuated to lower the upper grasping member 120 to grasp and restrain the belt-shaped member 39 immediately before the cutting position on both sides by the upper and lower grasping members 120 and 111 and 112. At this time, moreover, the cylinder 44 is actuated so raise the anvil 42 to bring the upper surface of the cutter abutting portion 43 of the anvil 42 into contact with the lower surface of the belt-shaped member 39 at the cutting position. The cylinder 55 is then actuated to move the carriage 53 and the cutter 54 toward the anvil 42 so that the belt-shaped member 39 restrained immediately before and behind the cutting position is cut in the width direction by the cutter 54 in cooperation with the anvil 42.

In this case, the time when the anvil 42 starts to contact the belt-shaped member 39 may be any time so long as it is after the grasping unit 122 starts to move toward the forming drum 31 together with the cut leading end 56 and before the belt-shaped member 39 is cut by the cutter 54. As a result of the cutting, the portion of the belt-shaped member 39 grasped by the grasping unit 122 becomes a trailing end of the belt-shaped member 39 which has been cut off, while the portion of the belt-shaped member 39 pressed by the urging member 66 becomes a leading end of the continuous belt-shaped member 39.

After cutting, the leading end of the belt-shaped member 39 tends to deform or contract. However, such deformation or contraction of the leading end of the belt-shaped member 39 is prevented by the urging member 66 without damaging the member 39 by the urging member 66. Such an effect can be accomplished by the functions of the urging member 66 in that the forward end of the urging member 6 is flexibly deformed following to the outer contour of the belt-shaped member 39 and is able to press over the entire width of the front end of the member 39 so that the urging member 66 can urging the forward end of the member 39 uniformly as a whole, even if the belt-shaped member 39 has a cross-section progressively increasing thicknesses toward the center in the width directions.

While the forming drum 31 is being rotated, the grasping unit 122 grasping the trailing end of the belt-shaped member 39 is moved toward the forming drum 31 at a speed substantially equal to the circumferential speed of the forming drum 31 so that the remaining belt-shaped member 39 is stuck onto the circumference of the forming drum 31. When the belt-shaped member 39 has been wound substantially one circumference around the forming drum 31 in this manner, the movement of the grasping unit 122 and the rotation of the forming drum 31 are stopped.

The cylinders 130 and 131 are actuated to move the first pressing pad 134 toward the forming drum 31 so that the trailing end of the belt-shaped member 39 is pressed against the circumference of the forming drum 31.

Thereafter, the cylinders 116 and 117 are actuated to raise the upper grasping member 120 to release the trailing end of the belt-shaped member 39 from the grasp of the grasping unit 122. The motors 83 and 98 are then energized so as to move the grasping unit 122 slightly rearwardly to remove the lower grasping members 111 and 112 from between the belt-shaped member 39 and the forming drum 31. In this case, the first pressing pad 134 continues to press the belt-shaped member 39 at the same position so that the cylinders 130 and 131 are rocked slightly in a clockwise direction about the pin 129.

The cylinders 130 and 131 are then actuated to move the first pressing pad 134 away from the belt-shaped member 39 so that the cylinders 130 and 131 are returned to the initial vertical position by an action of springs (not shown). With this condition, the cylinders 130 and 131 are actuated so as to press the proximity of the cut trailing end of the belt-shaped member 39 against the forming drum 31 by the first pressing pad 134 and then the first pressing pad 134 is moved away from the belt-shaped member 39.

The motors 83 and 98 are then energized to raise the grasping unit 122 and move it slightly forwardly and further lower it until the second pressing pad 142 becomes immediately above the top of the forming drum 31. At this instant, the forming drum 31 is slightly rotated to move the cut leading end 56 and the cut trailing end of the belt-shaped member 39 to the top of the forming drum 31.

The cylinder 140 is then actuated to move the second pressing pad 142 toward the forming drum 31 so that the cut leading end 56 of the belt-shaped member 39 on the forming drum 31 and the cut trailing end are joined in overlapping joining or butting joining by the second pressing pad 142. Thereafter, the cylinder 140 is actuated to move the second pressing pad 142 away from the belt-shaped member 39.

At this time, the cylinder 44 is actuated to lower the anvil 42 from the position in the phantom lines to the position in the solid lines away from the cut leading end 56 of the belt-shaped member 39 (FIG. 3). As a result, the space 46 is formed between the cut leading end 56 of the belt-shaped member 39 and the anvil 42.

The motors 83 and 98 are then actuated to move the grasping unit 122 toward the cut leading end 56 of the belt-shaped member 39. The movement of the grasping unit 122 is stopped when part of the grasping unit 122 or the lower grasping members 111 and 112 in this case enter the space 46 and arrive immediately below the cut leading end 56 and the upper grasping member 120 arrives immediately above the cut leading end 56.

The cylinders 116 and 117 are then actuated to lower the upper grasping member 120 so that the cut leading end 56 of the belt-shaped member 39 is grasped by the upper grasping member 120 and the lower grasping members 111 and 112 from above and below. In this case, the time when the anvil 42 is moved away from the belt-shaped member 39 may be at any time so long as it is after the belt-shaped member 39 is cut by the cutter 54 and before the cut leading end 56 of the belt-shaped member 39 is grasped by the grasping unit 122.

With the arrangement above described, the cutting position and the grasping position with respect to the belt-shaped member 39 are coincident with each other. Therefore, the urging position by the urging member 66 can be spaced from the grasping position by the grasping unit 122. In other words, the urging position and grasping position can be located at different positions. As a result, when the belt-shaped member 39 is to be grasped by the grasping unit 122, it is not necessary to previously move the urging member 66 away from the belt-shaped member 39 in order to avoid any interference between the grasping unit 122 and the urging member 66. As a result, it is possible to continue pressing and restraining the leading end of the belt-shaped member 39 by the urging member 66. As a result, the leading end of the belt-shaped member 39 is prevented from moving and contractive deforming.

The cylinder 62 is then actuated to rotate the urging member 66 in the clockwise direction viewed in FIG. 3 to move the urging member 66 away from the leading end of the belt-shaped member 39, thereby releasing the belt-shaped member 39 from positional fixation by the urging member 66.

In the above embodiment, the belt-shaped member 39 is directly stuck onto the outer circumference of the forming drum 31. According to the invention, however, the belt-shaped member 39 may be stuck indirectly through a belt-shaped member 39 already stuck to the forming drum 31. In the above embodiment the cutter 54 is moved straight toward the anvil 42 to cut the belt-shaped member 39. In this invention, however, cutter may be moved in the width direction of the belt-shaped member 39 to cut it.

As can be seen from the above description, according to the invention any contractive deformation and scores in leading ends of belt-shaped members can be prevented.

While the invention has been particularly shown and descried with reference to preferred embodiments thereof, it will be understood by those skilled in the art that the foregoing and other changes in form and details can be made therein without departing from the spirit and scope of the invention.

What is claimed is:

1. An apparatus for sticking a cut belt-shaped member onto a forming drum comprising; a rotatable forming drum around which a belt-shaped member is stuck, grasping means movable between the proximity of a position where said belt-shaped member is cut and the forming drum for grasping the belt-shaped member, said grasping means grasping a cut leading end of the belt-shaped shaped member, pressing means for pressing the leading end of the belt-shaped member against the forming drum said grasping means comprising an upper grasping member extending in width directions of the belt-shaped member and having at its lower end a soft body and two lower grasping members rockable in a horizontal plane between a grasping position in parallel with the width direction of the belt-shaped member and a poised position in parallel with a longitudinal direction of the belt-shaped member, and urging means movable toward and away from the belt-shaped member and urging and positionally fixing the belt-shaped member immediately behind of said position over an entire width of the belt-shaped member when the urging means moved toward the belt-shaped member.

2. An apparatus as set forth in claim 1, wherein said pressing means comprises a first pressing pad extending in the width directions of the belt-shaped member and movable toward and away from the belt-shaped member and a second pressing pad extending in the width directions of the belt-shaped member and movable toward and away from the belt-shaped member, the first and second pressing members being arranged side by side in longitudinal directions of the belt-shaped member.

3. An apparatus as set forth in claim 1, wherein said grasping means comprises two rotary actuators whose one ends are fixed to a bracket, said two lower grasping members extending horizontally and connected to the other ends of the rotary actuators, respectively, to be rockable in a horizontal plane, at least one cylinder whose one end is fixed to the bracket, and said upper grasping member extending in the width directions of the belt-shaped member and connected to the other end of the cylinder, and said pressing means comprises a pair of front cylinders pivotally connected onto a front side of the bracket, a first pressing pad extending in the width directions of the belt-shaped member and connected to rod ends of the pair of front cylinders, a pair of rear cylinders pivotally connected onto a rear side of the bracket, and a second pressing pad extending in the width directions of the pair of rear cylinders, thereby arranging the first and second pressing pads forwardly and rearwardly of the grasping means.

4. An apparatus for sticking a belt-shaped member onto a forming drum comprising; a rotatable forming drum around which a belt-shaped member is stuck, an anvil arranged adjacent to the forming drum and movable toward and away from the continuous belt-shaped member so that the anvil becomes in contact with the belt-shaped member when moved toward the belt-shaped member and a space is formed between the anvil and the belt-shaped member when moved away from the belt-shaped member, cutting means for cutting the belt-shaped member at a cutting position spaced from a cutting leading end of the belt-shaped member a distance substantially equal to one circumferential length of the forming drum, grasping means including an upper grasping member extending in width directions to the belt-shaped member and having at its lower end a soft body and two lower grasping members rockable in a horizontal plane between a grasping position in parallel with the width direction of the belt-shaped member and a poised position in parallel with a longitudinal direction of the belt-shaped member, said grasping means movable between the proximity of the cutting position and the forming drum for grasping the belt-shaped member, said grasping means grasping the cut leading end of the belt-shaped member when a portion of the grasping means has entered said space, pressing means for pressing the leading end of the belt-shaped member when a portion of the grasping means has entered said space, pressing means for pressing the leading end of the belt-shaped member against the forming drum, and urging means movable toward and away from the belt-shaped member and urging and positionally fixing the belt-shaped member immediately behind of the cutting position over an entire width of the belt-shaped member when the urging means are moved toward the belt-shaped member, said urging means being deformable following to an outer contour of the belt-shaped member.

5. An apparatus as set forth in claim 4, wherein said anvil is slidably movable received in a channel groove of a receiving member and having a cutter abutting position against which said cutting means abuts.

6. An apparatus as set forth in claim 4, wherein said pressing means comprises a first pressing pad extending in the width directions of the belt-shaped member and movable toward and away from the belt-shaped member and a second pressing pad extending in the width directions of the belt-shaped member and movable toward and away from the belt-shaped member, the first and second pressing members being arranged side by side in longitudinal directions of the belt-shaped member.

7. An apparatus as set forth in claim 4, wherein said grasping means comprises two rotary actuators whose one ends are fixed to a bracket, two lower grasping members extending horizontally and connected to the other ends of the rotary actuators, respectively, to be rockable in a horizontal plane, at least one cylinder whose one end is fixed to the bracket, and an upper grasping member extending in the width directions of the belt-shaped member and connected to the other end of the cylinder, and said pressing means comprises a pair of front cylinders pivotally connected onto a front side of the bracket, a first pressing pad extending in the width directions of the belt-shaped member and connected to rod ends of the pair of front cylinders, a pair of rear cylinders pivotally connected onto a rear side of the bracket, and a second pressing pad extending in the width directions of the belt-shaped member and connected to rod ends of the pair of rear cylinders, thereby arranging the first and second pressing pads forwardly and rearwardly of the grasping means.

8. An apparatus as set forth in claim 4, wherein said urging means comprises an urging member in the form of a thin plate wider than the belt-shaped member and formed at its forward end with a number of slits opening forwardly and arranged in a row in the width directions.

9. A method of sticking a belt-shaped member on a forming drum comprising steps of; moving an anvil away from the belt-shaped member to form a space between the anvil and the belt-shaped member, grasping a cut leading end of the belt-shaped member, by a grasping means having two lower members rockable in a horizontal plane between a grasping position in parallel with the width direction of the belt-shaped member and a poised position in parallel with a longitudinal direction of the belt-shaped member, after part of the grasping means has entered the space, and moving the urging member away from the belt-shaped member to release the belt-shaped member from its positional fixation, moving said grasping means to grasp a cut leading end of a belt-shaped member toward the forming drum to press the leading end of the belt-shaped member against the forming drum by pressing means, supplying the belt-shaped member onto the forming drum being rotated to stick the belt-shaped member onto a substantial part of a circumference of the forming drum, grasping the belt-shaped member at a position immediately before a cut position spaced from the cut leading end a distance substantially equal to one circumferential length of the forming drum, while pressing and positionally fixing the belt-shaped member at a position immediately behind the cutting position over an entire width of the belt-shaped member by urging means deformable following to an outer contour of the belt-shaped member, cutting the belt-shaped member at the cutting position by cutting means and an anvil in contact with the belt-shaped member, and moving the grasping means grasping a trailing end of the belt-shaped member toward the forming drum being rotated to stick the remaining belt-shaped member onto the circumference of the forming drum.

* * * * *